Sept. 19, 1967      H. F. SWENSON      3,342,328
DIALYZER MEMBRANE STORAGE ASSEMBLY
Filed April 14, 1966
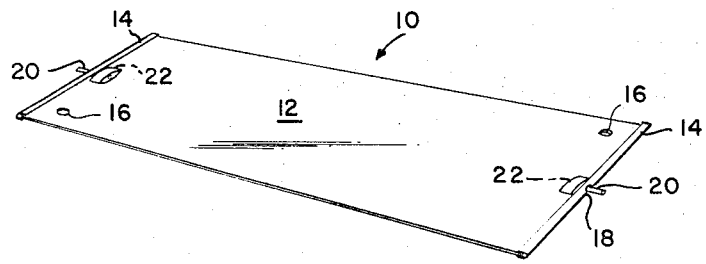
FIG__1
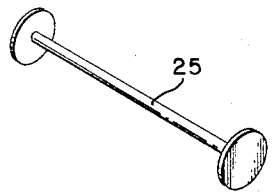
FIG__2
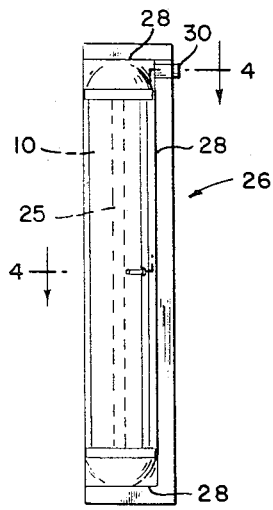
FIG__3
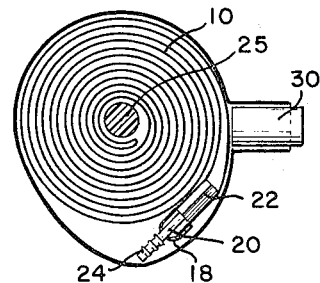
FIG__4
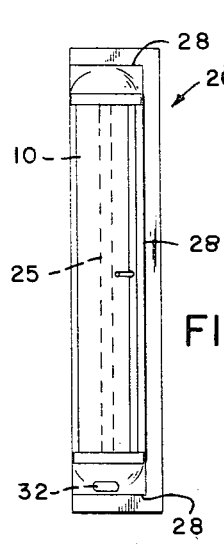
FIG__5
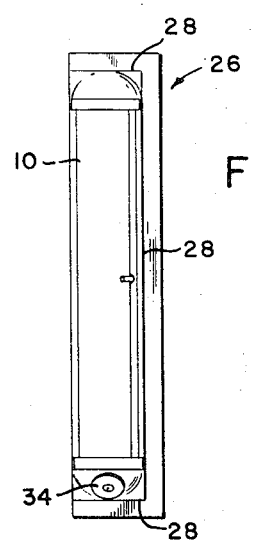
FIG__6
HARVEY F. SWENSON
*INVENTOR.*
BY *Seeda Berry*
*ATTORNEYS*

United States Patent Office 3,342,328
Patented Sept. 19, 1967

3,342,328
DIALYZER MEMBRANE STORAGE ASSEMBLY
Harvey F. Swenson, 3401 17th Ave. W.,
Seattle, Wash. 98119
Filed Apr. 14, 1966, Ser. No. 542,674
7 Claims. (Cl. 206—63.2)

ABSTRACT OF THE DISCLOSURE

A dialysis membrane envelope is stored in a sterile condition within a sterilely-sealed enclosure. The enclosure may be provided with a sterile opening through which a sterile solution can be introduced to the membrane envelope.

---

This is a continuation-in-part of United States patent application Ser. No. 503,002, filed October 23, 1965, the disclosure of which is incorporated herein by this reference to the extent needed and pertinent.

This invention relates to hemodialysis apparatus, and more particularly to a dialysis membrane storage assembly for maintaining dialysis membranes in a sterile, usable condition prior to their employment in hemodialysis.

In recent years, artificial kidneys have been employed to treat patients with acute renal failure and to rehabilitate patients who would otherwise die of chronic uremia. An essential feature of an artificial kidney system is the dialyzer. The Kiil-type dialyzer, which is generally preferred, comprises two cellophane semi-permeable membrane envelopes, the border portions of which are clamped by a suitable membrane support assembly (dialyzer) such that small portions of a patient's blood can pass through the envelope in counterflow to dialysis solution passing on the outer surfaces of the envelopes. The dialysis solution removes waste from the blood portions by a permeation phenomenon. Because of the nature of hemodialysis, the permeation process, or dialysis, must be conducted under carefully controlled conditions.

Prior to placement of these membrane envelopes in a dialyzer, the membranes must be maintained in a sterile and wetted condition. This commonly is accomplished by immersing the membranes in a pan containing a zepherine chloride solution. Whenever a membrane is required someone reaches into the solution takes out a membrane. This procedure is not only messy but also subjects the solution and the membrane to contamination problems. If the membranes are permitted to dry out, they may become embrittled and useless for dialysis.

The membrane is often made from cellophane or other semi-permeable material. It is as thin as can be made and handled without rupture since its permeability is greatly affected by the membrane thickness. To avoid interference with its dialyzing ability and minimize the possibility of contaminating the blood or the carefully balanced chemical solutions in contact with it during dialysis, additives which are normally used in manufacturing cellophane or other membrane sheets, to enhance its production, handling or use, cannot be added to its material content or applied to its surface. The resulting material is relatively strong when wet but brittle when dry so it is handled, stored and shipped in bundles containing many sheets so that the sheets adequately support themselves. During manufacture, the sheets are stretched as they are made and dried. But if the storage humidity is not controlled, the sheets will shrink and wrinkle, eventually resulting in cracks in the wrinkles. It is therefore advantageous to maintain the sheets in a wet condition from manufacture to use thereby eliminating the need for humidity control.

Further, known dialyzers have employed individual sheets of cellophane as the membrane halves of the envelopes and because of their wetted condition, considerable difficulty was frequently encountered in properly positioning and stretching these sheets in the dialyzer.

A primary object of this invention is to provide a dialysis membrane storage assembly which ensures that a dialysis membrane envelope will be maintained in a sterile and, if desired, a wetted condition prior to use. Another object is to provide such apparatus which permits installing a membrane envelope in a dialyzer as a unit or kit vis-a-vis separate sheets installed individually. A further object is to provide such an assembly which is inexpensive and wherein every component is disposable.

These and other objects and advantages of this invention will become apparent from consideration of the accompanying drawings, in which:

FIG. 1 depicts a membrane kit stretched and ready for installation in a dialyzer;

FIG. 2 depicts a spool on which a membrane kit could be rolled preparatory to being sealed in a sterile enclosure;

FIG. 3 depicts a rolled membrane kit sealed in one embodiment of a sterile enclosure;

FIG. 4 is a cross section along the line 4—4 in FIG. 3; and

FIGS. 5–6 depict two other embodiments of a sealed sterile enclosure.

Briefly, this invention comprises a dialysis membrane envelope compactly folded or wound and placed within a sterile enclosure. The membrane envelope can be stored within the sterile enclosure in either a dry or a wet condition, as desired. Two opposite edges of the membrane envelope are provided with stiffening members which facilitate folding or winding the membrane envelope and placing it within the enclosure and which facilitates stretching the membrane envelope and installing it in a dialyzer.

FIG. 1 shows a dialysis membrane envelope 10 comprising a pair of membrane sheets 12, as of cellophane, edge-clamped together by sheet metal channel strips 14—14 which are crimped in position. The sheets may be formed with port holes 16 in order not to interfere with the flow of dialysis solution between the end passages of a dialyzer. Each of the clamping strips 14 has a central cutout 18 and is dished outwardly, top and bottom, about the cutout for passage therethrough of a tubular extension or nipple 20 on an adapter 22. The main body of the adapter is oblong in transverse cross-section, feathering down to its longitudinal side edge, and has a longitudinal blood flow passage therethrough continuing from the bore of the nipple 20. Teeth 24 are preferably provided on the outer end portion of the nipple to aid in coupling of the blood tubes thereto. These teeth also resist separation of the adapter from between the membrane sheets 12 before use of the membrane kits. The adapters and their nipples may be formed of polyethylene.

Because of the provision of the channel strips 14—14, a single operator can easily stretch and position the pairs of membrane sheets by gripping the strips at each end of the respective kit and pulling them apart to tension the sheets before positioning the kits in the dialyzer. By crimping the channel strips so that they are clamped against the opposite edges of the membrance sheets as described above, the membrane sheets are prevented from slipping relative to one another when tensioned and positioned in the dialyzer. The other two sides of the membrane sheets are left open and unrestrained to facilitate a smoother application of the membrane sheets. The function of the strips is to aid in initial positioning and assembly of the dialyzer without danger of contaminating the inside faces of the membrane sheets which will be exposed to the patient's blood during dialysis, and hence is terminated upon clamping of the dialyzer components together. When dialysis is completed, the membrane kits are normally considered completely disposable, and so fresh kits are used for the next dialysis.

Pursuant to the present invention, each membrane kit may be compactly stored, after assembly of the membrane sheets, tensioning strips, and adapters, in a sterilized pack by rolling it about one of the tensioning strips or otherwise folding it into a compact roll, or the like, and packing it into a sterilizingly-sealed envelope with, if desired, the membrane sheets wetted by a sterile solution such as zepherine chloride to prevent cracking of the sheets during storage. FIGS. 3 and 4 show the FIG. 1 membrane kit rolled onto the FIG. 2 spool 25 and sealed within a sterile plastic sheet pack 26. The pack can be conveniently formed from a rectangular sheet by positioning the folded membrane kit in the center of the sheet, bringing the edges of the sheet together and heat sealing the adjacent edges as at 28 to form a sterilizable pack. The assembly of the pack about the folded membrane kit could be done in a sterile atmosphere, as in a gas sterilizer, such that the sealed pack contains a sterile atmosphere. Alternately, some such device as a permeable wick 30 could be positioned through the heat seal as shown so that the sealed pack could be placed in a gas sterilizer and the pack interior and membrane kit sterilized through the wick. The permeability of the wick should be sufficiently low that little or no air interchange with the sterilized gas entrapped in the pack will occur after sterilization. Should it be desired that a wetting and sterilizing medium such as zepherine chloride be added to the sterile pack, such medium could be added, before, during or after gas sterilization, through the wick 30.

FIG 5 depicts a variation of the FIGS 3-4 pack wherein a breakable ampule 32, filled with a wetting and sterilizing medium, is positioned within the pack before heat sealing. The ampule can be broken to release the medium into the pack interior.

FIG. 6 depicts still another variation of the FIGS 3-4 pack wherein a valve 34 is provided in one of the pack side walls to enable a needle, or the like, to be inserted into the pack interior for injection of a wetting and sterilizing medium.

Instead of rolling the membrane kit as shown in the FIGS., the membrane kit could be folded in accordion pleats to provide a compact unit for packing. The important feature, is that the membrane kit should be placed in a compact form to facilitate packing, storage and shipping. The pack can be fabricated from more rigid materials which may or may not be closable by heat sealing. Because the membrane kit is disposable and hence must be relatively inexpensive to be practical, light weight inexpensive flexible heat sealable plastic sheeting which is moisture proof and capable of substantially holding a sterile gas would be preferable, however. Expensive packaging materials would not be particularly adapted for use in the invention where an important aim is to provide an inexpensive, sterile and conveniently installable membrane kit for hemodialysis.

By the present invention membrane sheets could be packaged by the manufacturer in a wetted and sterile state so that the sheets are never dried. Thus, the sheet could be made thinner by taking advantage of its wet strength and humidity problems encountered with dry sheets could be eliminated.

It is believed that the invention will have been clearly understood from the foregoing detailed description of my now-preferred illustrated embodiment. Changes in the details of construction may be restored to without departing from the spirit of the invention and it is accordingly my intention that no limitations be implied and that the hereto annexed claims be given the broadest interpretation to which the employed language fairly admits.

What is claimed is:

1. A dialysis membrane storage assembly which comprises at least one membrane envelope wherein said membrane envelope comprises a pair of membrane sheets and clamping means edge clamping opposing sides of said membrane sheets together; and enclosure means sterilely sealed around said membrane envelope.

2. The assembly of claim 1 wherein said clamping means comprise two channel shaped strips crimped in position and each provided with a cutout; and including blood access means extending through the cutout to provide fluid communication with the membrane envelope interior.

3. The assembly of claim 2 wherein said access means each comprise an adapter within the membrane envelope and a tubular extension of said adapter protruding out through a cutout.

4. The assembly of claim 1 including means for introducing a sterile solution to the membrane envelope after said membrane envelope is sterilely sealed in said enclosure means, wherein the means for introducing a sterile solution to the membrane envelope comprises a permeable wick extending into said enclosure means.

5. The assembly of claim 1 including means for introducing a sterile solution to the membrane envelope after said membrane envelope is sterilely sealed in said enclosure means, wherein the means for introducing a sterile solution to the membrane envelope comprises an ampule filled with a sterile solution and sealed within said enclosure means.

6. The assembly of claim 1 including means for introducing a sterile solution to the membrane envelope after said membrane envelope is sterilely sealed in said enclosure means, wherein the means for introducing a sterile solution to the membrane envelope comprises a valve in a wall of said enclosure means.

7. The assembly of claim 3 wherein said enclosure means comprises a plastic sheeting having heat sealed edges.

References Cited

UNITED STATES PATENTS

| | | | |
|---|---|---|---|
| 1,175,369 | 3/1916 | MacDonald | 206—63.2 |
| 2,242,686 | 5/1941 | Tirrell. | |
| 2,309,399 | 1/1943 | Kohl | 206—10 X |
| 2,940,449 | 6/1960 | Thomson | 206—63.2 X |
| 3,084,793 | 4/1963 | Pitman | 206—63 |
| 3,146,884 | 9/1964 | Pereny et al. | 206—63.2 |
| 3,212,498 | 10/1965 | McKirdy et al. | 210—321 X |

THERON E. CONDON, *Primary Examiner.*

MARTHA L. RICE, *Examiner.*